United States Patent Office 3,316,495
Patented Apr. 25, 1967

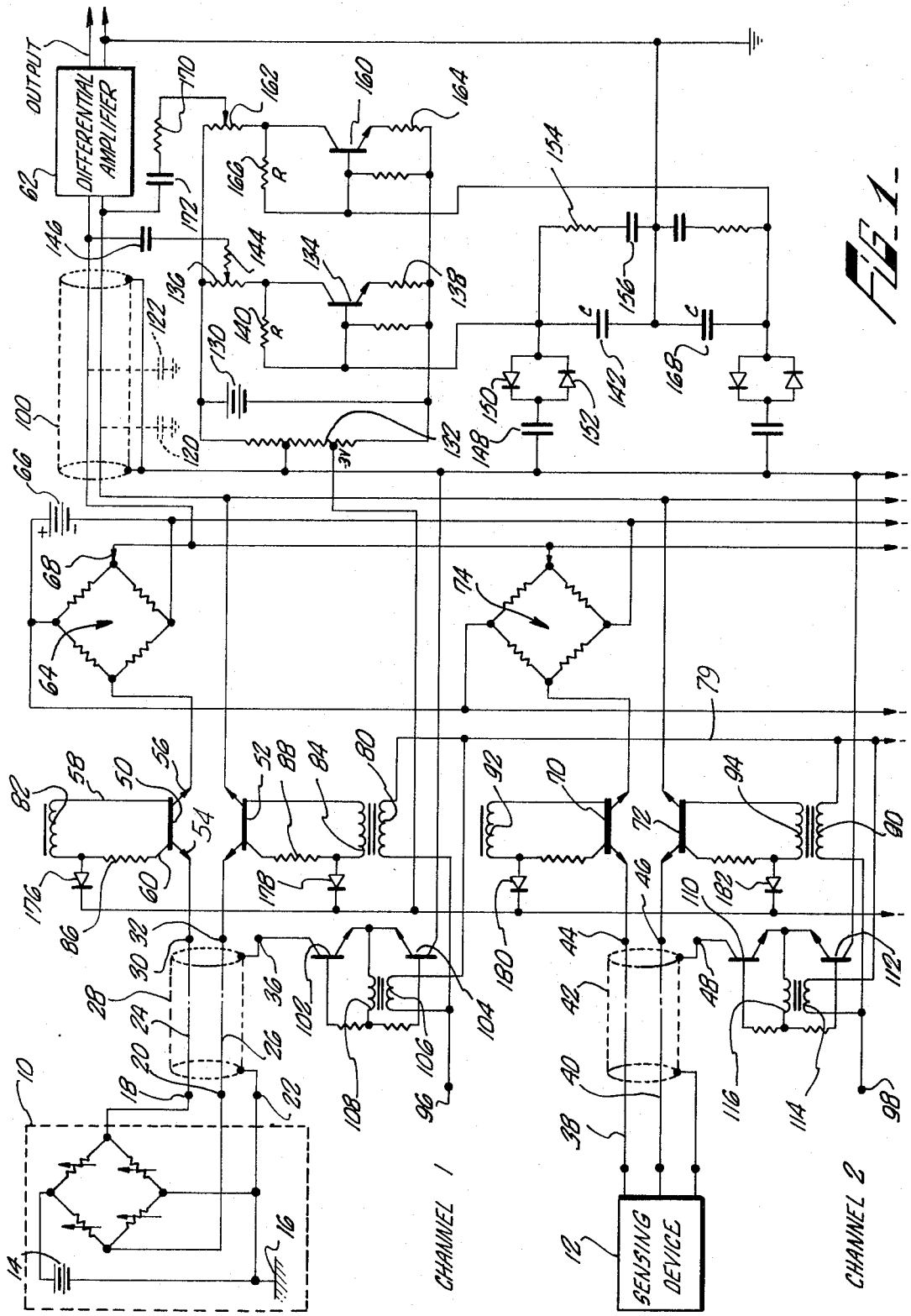

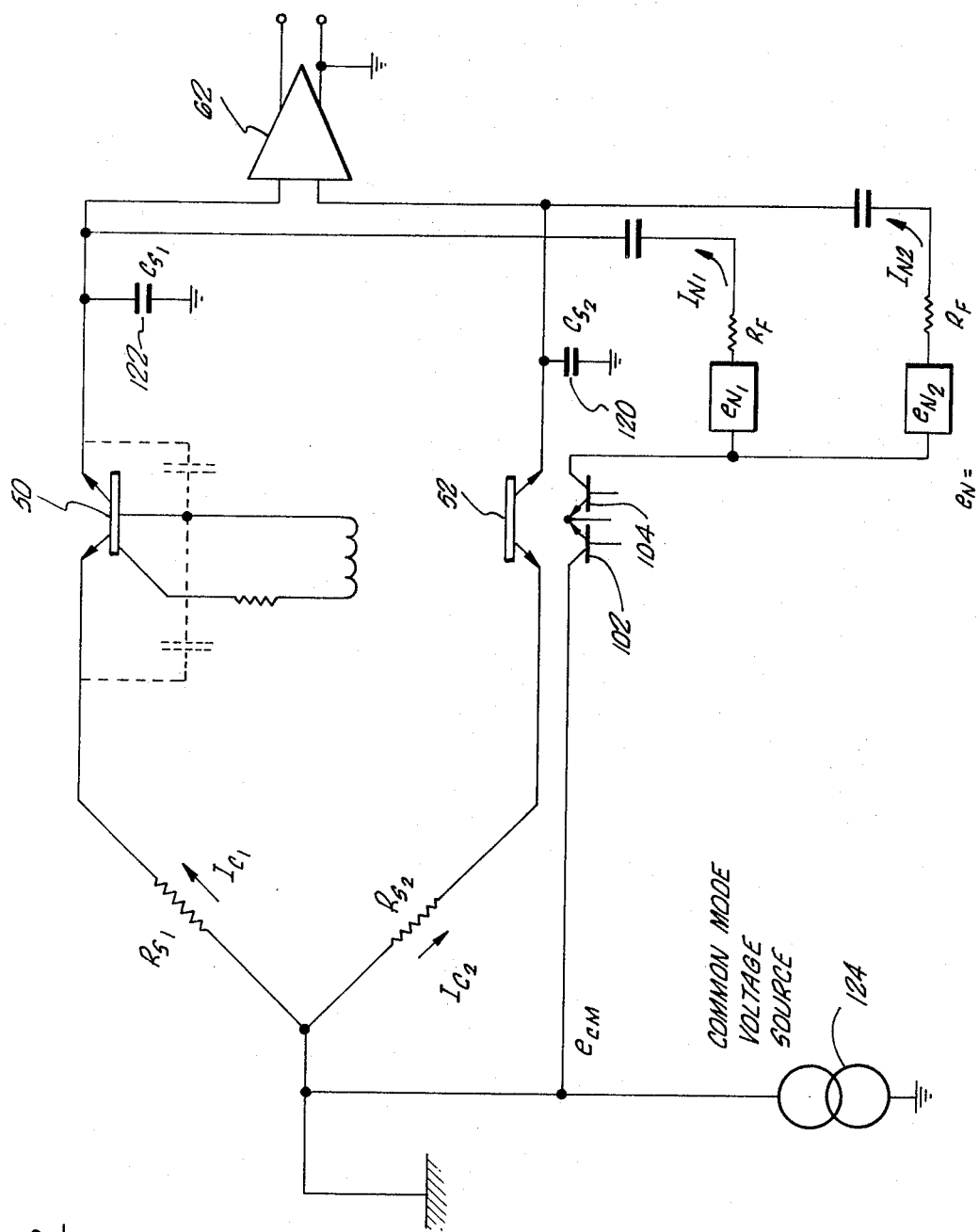

3,316,495
LOW-LEVEL COMMUTATOR WITH MEANS FOR PROVIDING COMMON MODE REJECTION
Paul N. Sherer, Pasadena, Calif., assignor to Consolidated Systems Corporation, Monrovia, Calif., a corporation of California
Filed July 6, 1964, Ser. No. 380,584
12 Claims. (Cl. 330—30)

This invention relates to low-level commutator circuits and, more particularly, is concerned with circuits for providing common mode rejection in each channel and between channels of a low-level commutator.

In correcting data on the operation of a system under test, various sensing devices, such as strain gauges, thermal couples, vibration sensors, and other types of transducers, are positioned at selected points of the system under test. Apparatus is provided for recording the signals generated by these various sensing devices so that the performance of the system can later be analyzed in detail. Generally, some sort of switching or commutating arrangement is employed so that the signals from the various sensing devices can be sampled sequentially in periodic fashion and applied, on a time shared basis, to a common output channel for recording.

Because the signals from the sensing devices are quite small, amplification of the signals is required before recording. While separate amplifiers can be provided for each sensing device, it is preferable that the switching take place ahead of the amplifiers so that a single amplifier can be used for all of the devices. However, switching of the signals before amplification, known as low-level commutation, presents a noise problem since the commutator circuit may produce noise signals which are of the same order of magnitude as the desired signals from the sensing devices.

One of the difficulties encountered in low-level commutating systems is that the sensing devices, located at remote points on the system under test, may vary in voltage in relation to the ground reference potential of the output amplifier. Such a voltage may be produced by hum pick-up or the like. For this reason, differential amplifiers are used so that the difference voltage generated by the sensing device is measured, while the common mode voltage, i.e., the voltage with respect to the ground reference potential, is rejected. However, either because of unbalance in the source resistance of the sensing device or because of unbalance in the stray capacitance of the connection from the sensing device back to the differential amplifier through the low-level switching circuit, currents produced by the common mode voltage may produce a voltage difference across the input leads to the differential amplifier which may be of the same order of magnitude as the desired signal. Likewise, where one sensing device is subject to a common mode voltage different from the others, the total interelectrode capacitance and leakage currents through the low-level switching circuit may result in poor rejection of the common mode voltages by the differential amplifier.

The present invention is directed to a low-level commutating circuit with improved common mode rejection for each channel as well as improved mode rejection between channels. This is accomplished in brief by providing a current source which is referenced to the common mode voltage at each sensing device when the device is connected to the differential amplifier by the commutator circuit. The current source provides a current through the stray capacitance of the input leads to the amplifier from the sensing device which is equal to the current that would otherwise flow through the stray capacitance due to the common mode voltage. By providing in effect a common mode current from another source, the current that would flow through the source resistance is effectively neutralized, thus eliminating any voltage across the input to the differential amplifier due to the common mode voltage at the sensing device. At the same time, any flow of current due to the difference in common mode voltage between the channel that is turned on and the ones that are turned off is neutralized by a circuit which ties all of the solid state switches in the "off" channels to the common mode voltage reference of the "on" channel.

For a more complete understanding of the invention, reference should be made to the accompanying drawings wherein:

FIGURE 1 is a schematic circuit diagram of a low-level switching circuit which incorporates the features of the present invention; and FIGURE 2 is a simplified schematic circuit diagram illustrating the principle of operation of the invention.

Referring to the drawing in detail, the numerals 10 and 12 indicate generally sensing devices which may be any well known type of transducer circuit for changing the variations in some parameter to a varying voltage. For example, the sensing device 10 may be a bridge type strain gauge in which the resistance of the arms is varied with strain supplied to the mounting of the resistors. The bridge is energized from a suitable D.C. potential source such as a battery 14. One point on the bridge is usually connected to the frame of the system under test, as indicated at 16. To measure changes in the balance of the bridge, a voltage signal is derived across one diagonal of the bridge and applied to a pair of output terminals 18 and 20. The common point 16 is brought out to an output terminal 22.

While only two sensing devices are shown in FIGURE 1, it will be understood that in a typical system, a fairly large number of such sensing devices may be employed. Each sensing device is connected by a cable back to the low-level commutator. Thus the device 10 is shown as connected by a cable including a pair of leads 24 and 26 enclosed within a shield 28 which are respectively connected to the terminals 18, 20 and 22 of the associated sensing device 10. The two leads in the shield of the cable in turn are connected to a first input channel of the commutating circuit at input terminals 30, 32 and 36 respectively. Similarly, a second cable having a pair of leads 38 and 40 and a shield 42 connects the sensing device 12 to the three input terminals, indicated at 44, 46 and 48, of a second input channel to the low-level commutating circuit.

Each input channel of the low-level commutating circuit includes a pair of solid state four-element devices, indicated at 50 and 52 for the first channel. These four-element solid state devices are known as integrated choppers. Each chopper includes a pair of emitter terminals 54 and 56, a base terminal 58 and a collector terminal 60. One emitter electrode of the integrated chopper 50 is connected to the input terminal 30 of the low-level commutator circuit. The other emitter 56 is connected to a differential amplifier 62 through a zero-offset compensating circuit, indicated generally at 64. Similarly, the emitter electrodes of the integrated chopper 52 are connected respectively to the terminal 32 at the input of the commutator circuit and to the other input to the differential amplifier 62. The zero-offset circuit 64 is in the form of a bridge having a potential from a floating supply 66 connected across one diagonal. The other diagonal is connected between the emitter electrode 56 and the input to the differential amplifier 62. Two arms of the bridge are in the form of a potentiometer having an adjustable contact 68 by means of which a reversible polarity D.C.

may be inserted in series with the one input to the differential amplifier 62.

Similarly, the second channel of the low-level commutator is provided with a pair of integrated choppers 70 and 72 having one emitter terminal of each integrated chopper connected respectively to the input terminals 44 and 46 of the second channel. The other emitter terminals of the integrated choppers 70 and 72 are connected in parallel with the output of the first channel to the inputs of the differential amplifier 62. A zero-offset circuit, indicated at 74, is provided in series with the emitter of the integrated chopper 70 and is energized from the same floating potential source 66 as the zero-offset compensation circuit 64.

The integrated choppers operate as switches in response to a current passed between the base and the collector. The integrator choppers 50 and 52 are controlled by a pulse transformer having a primary winding 80 and a pair of secondary windings 82 and 84. The secondary winding 82 is connected to the base 58 and, through a resistor 86, to the collector 60 of the integrated chopper 50. Similarly, the secondary winding 84 is connected to the base and collector electrodes of the integrated chopper 52 through a series resistor 88. The integrated choppers 70 and 72 of the second channel are controlled by a pulse transformer having a primary winding 90 and secondary windings 92 and 94 connected respectively to the base and collector electrodes of the chopper 70 and the base and collector electrodes of the chopper 72.

One end of the primary of each of the pulse transformers is connected to a common lead 79. The other end of the primary winding 80 is brought out to a pulse input terminal 96, while the other end of the primary winding 90 is brought out to a pulse input terminal 98. Pulses are applied to the channel input terminals 96 and 98 as well as to corresponding terminal inputs to all the other channels of the low-level commutator in sequence from a suitable pulsing source (not shown). When pulsed, each pulse transformer renders the associated integrated choppers conductive during the duration of the pulse. The integrated choppers then form a low impedance path to current flow between the associated input terminals to the low-level commutator and the input terminals to the differential amplifier 62. When the integrated choppers in a particular channel are turned on, the voltage generated by the associated sensing device is applied across the input terminals to the differential amplifier 62.

Each channel also includes a shield switch by means of which the shields of the input leads, such as the shields 28 and 42, are connected to a shield 100 on the leads going to the input of the differential amplifier 62. For this purpose, a standard transistor switch may be employed. The shield switch for channel 1 is shown as including a pair of transistors 102 and 104 having their collectors connected respectively to the shield 28 and the shield 100 and having their emitters connected together. The switch is operated by a pulse transformer having a primary winding 106 connected in parallel with the primary winding 80 of the integrated chopper pulsing transformer. The secondary winding 108 is connected between the emitters and the respective bases of the transistors 102 and 104 so that the two transistors are rendered conductive in response to a pulse on the input 96 of channel 1.

Similarly, a pair of transistors 110 and 112 have their collector-emitter circuits connected in series between the shield 42 and the shield 100. These transistors are turned on by a pulse transformer having a primary 114 connected in parallel with the primary 90 of the pulsing transformer. A secondary winding 116 is connected between the emitters and the base electrodes of the transistors 110 and 112.

The differential amplifier 62 is selected to provide stable operation with a high degree of common mode rejection, i.e., it responds to voltage differences between the input terminals but is not affected by voltages which are common to both input terminals with respect to the ground reference of the output of the amplifier. However, common mode voltages at the sensing device may result in an unwanted voltage difference occurring between the input terminals of the differential amplifier 62. For example, the sensing device is tied to the frame 16 of the system under test. Because of hum pick-up and the like, an A.C. voltage of several volts may develop between the frame grounding point 16 and the reference ground potential at the output of the differential amplifier 62. Because of distributed capacitance in the commutator system and the leads between the sensing device and the differential amplifier, common mode currents can flow between the frame point 16 through the source resistors of the bridge circuit in the sensing device and through the leads 24 and 26 back to the ground reference potential through the distributed capacitance. If either the stray capacitances or the source resistances are unbalanced, an unequal voltage drop will occur across the source resistances due to the common mode currents, resulting in a voltage difference between the input terminals to the differential amplifier 62. This effect is neutralized in the present invention by a circuit which supplies the common mode currents from another source so that current flow through the source resistances is effectively eliminated.

FIGURE 2 illustrates in simplified form the circuit for one channel. A common mode voltage source, indicated at 124, is shown as producing a voltage $e_{cm}$ which results in a flow of current $i_{c1}$ passing through a source resistor $R_{s_1}$ of the sensing device, through the integrated chopper switch 50 and back to ground through the distributed capacitance $C_{s_1}$, indicated at 122. Similarly, a current $i_{c2}$ passes through the source resistor $R_{s_2}$ through the switch 52 and back to ground through the distributed capacitance $C_{s_2}$ indicated at 120. If the currents $i_{c1}$ and $i_{c2}$ are unequal, the IR drops will be unequal across the source resistances and a voltage difference will be produced across the inputs of the differential amplifier 62 which would be superimposed on any signal voltage which was being measured.

By the present invention, a current $i_{n_1}$ is generated by a current generator including a voltage source $e_{n_1}$ and large series resistor $R_f$. The current generator is referenced to the common mode voltage source 124 and provides a current $i_{n_1}$ and $i_{n_2}$ at the input terminals to the differential amplifier 62. Since the input impedance of the amplifier 62 may be considered as very high, the current path is through the distributed capacitance $C_s$. If the current supplied by the current generator is equal to the common mode current, the net current flow through the associated source resistance will be zero, thus cancelling out any noise effect due to the common mode voltage. Assuming that the stray capacitive impedance is large compared to the source resistance, the common mode current may be expressed as:

$$i_{cm} = C_s \frac{de_{cm}}{dt} \qquad (1)$$

To provide neutralization, as pointed out above, $i_n$ is made equal to $i_{cm}$. Thus $$i_n = \frac{e_n - e_{cm}}{R_f} = i_{cm} = C_s \frac{de_{cm}}{dt} \qquad (2)$$

and therefore $$e_n = e_{cm} + R_f C_s \frac{de_{cm}}{dt} \qquad (3)$$

or $$e_n = A \sin wt + A w R_f C_s \cos wt \qquad (4)$$

From the above expression, it will be seen that the voltage $e_n$ must have a component which is in phase with the common mode voltage and a component which is 90° out of phase with the common mode voltage.

The preferred circuit for generating the required voltage $e_n$ is shown in detail in FIGURE 1. A power supply, indicated by a battery 130, but which may be any type of floating supply, is referenced to the common mode voltage by a parallel resistor 132 having an intermediate point thereof connected directly to the shield 100. A single stage amplifier including a transistor 134 has its collector connected through a load resistor 136 to one side of the supply 130 and has its emitter connected through a bias resistor 138 to the other side of the supply 130. A feedback resistor R, indicated at 140, connects the collector back to the base of the transistor 134. The base of the transistor 134 is conected to ground reference through a differentiating capacitor C, indicated at 142.

Any variation in the common mode voltage provides a corresponding in-phase voltage at the output from the load resistor 136 since the whole circuit is referenced to the common mode voltage. A variable tap on the resistor 136 is connected through the resistor $R_f$, indicated at 144, and through a large coupling capacitor 146 to the upper input terminal of the differential amplifier 62. Also, since the power supply to the amplifier is referenced to the common mode voltage, the capacitor 142 sees a voltage which is the inverse of the common mode voltage. The capacitor 142 and feedback resistor 140 provide a differentiating network in the manner of a conventional differentiating operational amplifier in which, because of the gain of the amplifier, the common point of the capacitor 142 and the resistor 140 is substantially at the same voltage as the shield 100. Thus both a sine and a cosine function of the common mode voltage are derived at the output from the load resistor 136.

To limit the effect of step changes in voltage occurring when switching from one sensing device to another, the shield 100 is connected to the base of the transistor 134 through a large coupling capacitor 148 and a pair of inverse parallel diodes 150 and 152. Thus the operating level at the base of the transistor is maintained substantially the same even though the shield 100 changes abruptly in potential with switching from one sensing device to another. A resistor 154 and series capacitor 156 connect the base of the transistor to ground to provide phase correction.

A similar circuit includes a transistor 160 having a load resistor 162 and self-bias resistor 164 connected across the supply 130. The base and collector are connected by a feedback resistor 166 while the base is connected to ground reference potential through a differentiating capacitor 168. The output of the amplifier is connected from a point on the load resistor 162 through a large series current limiting resistor 170 and coupling capacitor 172 to the other terminal of the differential amplifier 62.

Another feature of the present invention, is a circuit arrangement for providing channel-to-channel common mode rejection. If one channel rides at a common mode voltage which is different from other channels, interelectrode capacitance at the integrating choppers can cause poor common mode rejection. Common mode rejection between channels is improved by connecting the collector electrode of each of the integrated choppers through a diode, such as indicated at 176 for the integrated chopper 50, 178 for the integrated chopper 52, 180 for the integrated chopper 70 and 182 for the integrated choper 72. All of these diodes are connected back through a common lead to a tap on the resistor 132 which is of the order of −3 volts with respect to the shield 100, assuming that the system is designed to operate at variations in common mode voltage between channels of ±2.5 volts. Assuming channel 1 is being turned on, the pulse applied to the integrated choppers to turn them on causes diodes 176 and 178 to be back-biased due to the IR drop across the associated resistors, so that the diodes appear as open circuits. The base-collector circuits of all of the other integrator choppers are tied to shield 100 and follow the common mode voltage of the channel that is turned on. Thus the effect of any common mode currents which otherwise might be coupled by the interelectrode capacitance of the integrator choppers in the "off" channels is neutralized.

From the above description, it will be recognized that a low-level commutator circuit is provided which provides low level switching between a plurality of input channels from remote sensing devices and which, at the same time, provides a high degree of rejection at the input to the differential amplifier caused by common mode voltages generated at the sensing devices. Common mode currents which could be coupled to ground through interelectrode capacitance of the switching elements or through distributed stray capacitance of the signal leads is effectively neutralized.

What is claimed is:

1. A common mode rejection circuit for connecting a sensing device to the input terminals of a differential amplifier, the sensing device being electrically connected to a point which may vary in voltage with respect to a reference potential at one of the output terminals of the amplifier, said circuit comprising a first current source connected between said one output terminal and one input terminal of the differential amplifier and a second current source connected between said one output terminal and the other input terminal of the differential amplifier, each of said current sources including a common floating D.C. source referenced to said connection point by an electrical connection to said point, an amplifier energized from said source, a resistor connecting the output of the amplifier to the input, a capacitor connecting the amplifier input to said reference potential at the output of the differential amplifier, means including a capacitor and a pair of inverse parallel connected diodes connecting the amplifier input to said connection point of the sensing device, and means including a coupling capacitor and large series resistor connecting the amplifier output of the current source to the associated input terminal of the differential amplifier.

2. A common mode rejection circuit for connecting a sensing device to the input terminals of a differential amplifier, the sensing device being electrically connected to a point which may vary in voltage with respect to a reference potential at one of the output terminals of the amplifier, said circuit comprising a first current source connected between said one output terminal and one input terminal of the differential amplifier and a second current source connected between said one output terminal and the other input terminal of the differential amplifier, each of said current sources including a common floating D.C. source referenced to said connection point by an electrical conection to said point, an amplifier energized from said source, a resistor connecting the output of the amplifier to the input, a capacitor connecting the amplifier input to said reference potential at the output of the differential amplifier, and means including a coupling capacitor and large series resistor connecting the amplifier output of the current source to the associated input terminal of the differential amplifier.

3. A common mode rejection circuit for connecting a sensing device to the input terminals of a differential amplifier, the sensing device being electrically connected to a point which may vary in voltage with respect to a reference potential at one of the output terminals of the amplifier, said circuit comprising a first current source connected between said one output terminal and one input terminal of the differential amplifier and a second current source connected between said one output terminal and the other input terminal of the differential amplifier, each of said current sources including means responsive to the common mode voltage at said connection point for generating a voltage that is in phase and varies in amplitude with the common mode voltage, means responsive to the common mode voltage at said connection point for generating a voltage that is leading in phase quadrature by 90° and varies in amplitude with the common mode voltage, means for summing said voltages, a large resistor and coupling capacitor in series with the output of the summing means.

4. In a circuit in which a sensing device generates a signal coupled across the input terminals of a differential amplifier and in which stray capacitance exists between the input terminals and a ground reference point, a circuit for neutralizing the effect of currents flowing through the stray capacitance due to common mode voltage between the sensing device and ground reference comprising first and second current sources having their output terminals connected respectively between each of the input terminals of the differential amplifier and the ground reference point, each current source including means for sensing said common mode voltage, means responsive to the sensing means for generating a first voltage proportional to and in phase with the common voltage means responsive to the sensing means for generating a second voltage that is the derivative of the common mode voltage, a large resistor, and means for combining the first and second voltages and connecting the combined voltages in series with said resistor across the output terminals of the current source.

5. In a circuit in which a sensing device generates a signal coupled across the input terminals of a differential amplifier and in which stray capacitance exists between the input terminals and a ground reference point, a circuit for neutralizing the effect of currents flowing through the stray capacitance due to common mode voltage between the sensing device and ground reference comprising first and second current sources having their output terminals connected respectively between each of the input terminals of the differential amplifier and the ground reference point, each current source including a single stage amplifier having an input and output, a floating power supply connected to the amplifier to energize the amplifier, a large impedance coupling the output of the amplifier to an associated one of the input terminals of the differential amplifier, a feedback resistor connecting the output of the amplifier to the input, a capacitor connecting the input of the amplifier to the ground reference point, means for connecting the power supply to the sensing device to reference the power supply to the common mode voltage, and means including a coupling capacitor and inverse-parallel connected diodes for connecting the input to the amplifier to the sensing device.

6. A low level commutating circuit for successively connecting a plurality of signal sources across the input terminals of a differential amplifier wherein each signal source has a potential reference point which may vary in voltage with respect to a ground point connected to the differential amplifier, the commutating circuit comprising a plurality of solid state switching elements for selectively connecting each of the signal sources across the input terminals of the differential amplifier, each switching element providing low impedance current path in response to a current pulse across a pair of control electrodes, a plurality of switching elements for selectively connecting the potential reference point of each signal source to a common terminal, a floating power supply having four output taps at different relative potentials, one intermediate tap of the power supply being connected to said common terminal, means including a plurality of diodes respectively connecting the other intermediate tap of the power supply to one of the control electrodes of each of the solid state switching elements, first and second current sources having their output terminals connected respectively between each of the input terminals of the differential amplifier and said ground point, each current source including a single stage amplifier connected across the outer two taps of the power supply, means including a coupling capacitor for electrically connecting the input to the amplifier in each current source to said common terminal, means including a large series impedance connecting the output of the amplifier in each current source to respective ones of the differential amplifier input terminals, a feedback resistor connected between the input and output of the amplifier in each current source, and a differentiating capacitor connecting the input of the amplifier in each current source to the ground point.

7. A low level commutating circuit for successively connecting a plurality of signal sources across the input terminals of a differential amplifier wherein each signal source has a potential reference point which may vary in voltage with respect to a ground point connected to the differential amplifier, the commutating circuit comprising a plurality of solid state switching elements for selectively connecting each of the signal sources across the input terminals of the differential amplifier, each switching element providing low impedance current path in response to a current pulse across a pair of control electrodes, a plurality of switching elements for selectively connecting the potential reference point of each signal source to a common terminal, a floating power supply having a plurality of output taps at different relative potentials, one tap of the power supply being connected to said common terminal, first and second current sources having their output terminals connected respectively between each of the input terminals of the differential amplifier and said ground point, each current suorce including a single stage amplifier connected across two taps of the power supply, means including a coupling capacitor for electrically connecting the input to the amplifier in each current source to said common terminal, means including a large series impedance connecting the output of the amplifier in each current source to respective ones of the differential amplifier input terminals, a feedback resistor connected between the input and output of the amplifier in each current source, and a differentiating capacitor connecting the input of the amplifier in each current source to the ground point.

8. A low level commutating circuit for successively connecting a plurality of signal sources across the input terminals of a differential amplifier wherein each signal source has a potential reference point which may vary in voltage with respect to a ground point connected to the differential amplifier, the commutating circuit comprising a plurality of solid state switching elements for selectively connecting each of the signal sources across the input terminals of the differential amplifier, each switching element providing low impedance current path in response to a current pulse across a pair of control electrodes, a plurality of switching elements for selectively connecting the potential reference point of each signal source to a common terminal, a floating power supply having a plurality of output taps at different relative potentials, one tap of the power supply being connected to said common terminal, first and second current sources having their output terminals connected respectively between each of the input terminals of the differential amplifier and said ground point, each current source including a single stage amplifier connected across two taps of the power supply, means for electrically connecting the input to the amplifier in each current source to said common terminal, means connecting the output of the amplifier in each current source to respective ones of the differential amplifier input terminals, a feedback resistor connected between the input and output of the amplifier in each current source, and a differentiating capacitor connecting the input of the amplifier in each current source to the ground point.

9. A low level commutating circuit for successively connecting a plurality of signal sources across the input terminals of a differential amplifier wherein each signal source has a potential reference point which may vary in voltage with respect to a ground point connected to the differential amplifier, the commutating circuit comprising a plurality of solid state switching elements for selectively connecting each of the signal sources across the input terminals of the differential amplifier, each switching element providing low impedance current path in response to a current pulse across a pair of control electrodes, a plurality of switching elements for selectively connecting the potential reference point of each signal source to a common terminal, a floating power supply having output taps at different relative potentials, one tap of the power supply being connected to said common terminal, means including a plurality of diodes respectively connecting another tap of the power supply to one of the control electrodes of each of the solid state switching elements, and first and second current sources having their output terminals connected respectively between each of the input terminals of the differential amplifier and said ground point.

10. In a low level commutator circuit for connecting signals from a plurality of sensing devices successively to a common output, the sensing devices each having a reference potential point, the circuit comprising solid-state switching elements for connecting the outputs of the sensing devices to said common output, each switching element providing a low impedance path in response to a current pulse across a pair of control terminals, means including pulse transformers having the secondary windings connected across the pair of control terminals of respective switching elements for selectively actuating the solid-state switching elements, a floating potential source, switching means for connecting the potential reference point of each sensing device successively to one end of the floating potential source, and means including diodes for connecting the other end of the floating potential source to one control terminal of each of the solid-state switching elements.

11. In a low level commutator circuit for connecting signals from a plurality of sensing devices successively to a common output, the sensing devices each having a reference potential point, the circuit comprising solid-state switching elements for connecting the outputs of the sensing devices to said common output, each switching element providing a low impedance path in response to a current pulse across a pair of control terminals, means for selectively actuating the solid-state switching elements, a floating potential source, switching means for connecting the potential reference point of each sensing device successively to one end of the floating potential source, and means including diodes for connecting the other end of the floating potential source to one control terminal of each of the solid state switching elements.

12. In a low level commutator circuit for connecting signals from a plurality of sensing devices successively to a common output, the sensing devices each having a reference potential point, the circuit comprising switching elements for connecting the outputs of the sensing devices to said common output, each switching element providing a low impedance path in response to a current pulse across a pair of control terminals, means for selectively actuating the switching elements, a floating potential source, switching means for connecting the potential reference point of each sensing device successively to one end of the floating potential source, and means including diodes for connecting the other end of the floating potential source to one control terminal of each of the solid state switching elements.

No references cited.

ROY LAKE, *Primary Examiner.*

E. C. FOLSOM, *Assistant Examiner.*